(12) United States Patent
Kanda et al.

(10) Patent No.: US 10,174,270 B1
(45) Date of Patent: Jan. 8, 2019

(54) DUST-RESISTANT SLIDING MEMBER AND METHOD FOR PRODUCING SAME, WINDOW REGULATOR CARRIER PLATE, AND METHOD FOR REALIZING DUST-RESISTANT SLIDABILITY

(71) Applicant: POLYPLASTICS CO., LTD., Tokyo (JP)

(72) Inventors: Yuki Kanda, Fuji (JP); Tomohiro Monma, Fuji (JP); Takanori Ueda, Farmington Hills, MI (US)

(73) Assignee: POLYPLASTICS CO., LTD., Tokyo (JP)

( * ) Notice: Subject to any disclaimer, the term of this patent is extended or adjusted under 35 U.S.C. 154(b) by 0 days.

(21) Appl. No.: 15/718,390

(22) Filed: Sep. 28, 2017

(51) Int. Cl.
| | |
|---|---|
| *F16C 33/20* | (2006.01) |
| *C10M 107/50* | (2006.01) |
| *C10M 107/06* | (2006.01) |
| *C08L 59/00* | (2006.01) |
| *E05D 15/16* | (2006.01) |
| *E05F 11/38* | (2006.01) |

(52) U.S. Cl.
CPC ........... *C10M 107/50* (2013.01); *C08L 59/00* (2013.01); *C10M 107/06* (2013.01); *E05D 15/165* (2013.01); *C08L 2205/02* (2013.01); *C08L 2205/035* (2013.01); *C08L 2207/066* (2013.01); *C10M 2205/0245* (2013.01); *C10M 2229/0415* (2013.01); *C10N 2250/08* (2013.01); *E05F 11/382* (2013.01); *E05Y 2900/55* (2013.01)

(58) Field of Classification Search
CPC ............... C08L 59/00; C08L 2205/035; C08L 2203/20; C08L 2201/08; F16C 33/201
See application file for complete search history.

(56) References Cited

U.S. PATENT DOCUMENTS

| | | | | |
|---|---|---|---|---|
| 6,602,953 | B1 * | 8/2003 | Horio | .................... C08L 59/02 525/100 |
| 2017/0306140 | A1 * | 10/2017 | Shimoda | ................. C08L 59/00 |

FOREIGN PATENT DOCUMENTS

JP      2016-169344 A      9/2016

* cited by examiner

*Primary Examiner* — Vishal V Vasisth
(74) *Attorney, Agent, or Firm* — Westerman, Hattori, Daniels & Adrian, LLP

(57) ABSTRACT

A method for producing a dust-resistant sliding member, the method including a step of preparing a resin composition containing 0.5 to 5.0 parts by mass of a specific lubricant that is liquid at 25° C., 0.1 to 30 parts by mass of an inorganic filler, 1.0 to 20 parts by mass of a specific modified olefin-based polymer, and 0.01 to 5.0 parts by mass of an alkylene glycol-based polymer having a primary or secondary amino group, per 100 parts by mass of a polyacetal copolymer containing oxyalkylene units in a ratio of 0.4 to 0.9 mol % relative to all of the structural units; and a step of molding the resin composition into a prescribed shape.

14 Claims, No Drawings

DUST-RESISTANT SLIDING MEMBER AND METHOD FOR PRODUCING SAME, WINDOW REGULATOR CARRIER PLATE, AND METHOD FOR REALIZING DUST-RESISTANT SLIDABILITY

BACKGROUND

Technical Field

The present invention relates to a dust-resistant sliding member that uses a polyacetal resin and a method for producing the same, and also relates to a window regulator carrier plate, and a method for realizing dust-resistant slidability for a member produced using a polyacetal resin composition.

Related Art

Polyacetal resins (hereafter also referred to as "POM resins") exhibit a variety of excellent physical and mechanical properties, and are therefore widely used as engineering plastics in many applications. In particular, because POM resins exhibit excellent sliding properties, they are often used as sliding members such as bearings and gear components (P2016-169344A).

The mechanism for raising and lowering the door glass in an automobile is called a window regulator. A window regulator has a carrier plate that supports the door glass, a guide rail that supports the carrier plate in a manner that enables up and down movement of the carrier plate, and a drive portion that raises and lowers the carrier plate along the guide rail. In this mechanism, when the door glass is being raised or lowered, because the carrier plate slides in a state supported by the guide rail, a material having excellent slidability must be used for the sliding portion, and a molded member formed using a POM resin has typically been used.

Because this type of molded member is formed using a POM resin having excellent sliding properties, it exhibits a consistent effect in terms of slidability. However, when dust such as sand and moisture such as rainwater penetrates inside the door, the same thinking cannot be applied. In other words, under these types of conditions, if up and down movement occurs with the members rubbing against one another, then various problems can arise, including the occurrence of abnormal noises known as squeak noises, and an increase in the amount of abrasion. The problem of squeak noises is particularly noticeable in semi-dry state environments, or in environments where dust of small particle size exists.

It has typically been thought that, even under these types of conditions, abnormal noises could be suppressed and good friction and wear resistance could be achieved by applying a grease to the sliding portion. However, recent developments have tended to focus on methods for addressing the above problems without using grease. For example, a method has been proposed in which the window regulator is produced using a special grade of POM resin for just the sliding portion, and using a standard grade POM resin for the remaining portions. However, differentiating the materials for the sliding portion and the remaining portions raises other problems, including an increase in the workload required to assemble the mechanism, and an increase in costs. Accordingly, it is desirable that the type of molded member described above is produced using a single POM resin composition.

On the other hand, because the carrier plate requires excellent mechanical properties (tensile strength) in order to support the door glass in the manner described above, it is necessary to improve the friction and wear resistance without impairing the mechanical properties.

Objects of the present invention are to provide a dust-resistant sliding member which, even in an environment in which dust such as sand and moisture exist, exhibits excellent friction and wear resistance and suffers extremely little abnormal noise generation during sliding, regardless of the particle size of the dust, and also exhibits excellent mechanical properties (tensile strength), and also to provide a method for producing the dust-resistant sliding member, a window regulator carrier plate, and a method for realizing dust-resistant slidability.

SUMMARY

A method for producing a dust-resistant sliding member according to the present invention includes:

a step of preparing a resin composition containing:

0.5 to 5.0 parts by mass of a lubricant (B) that is liquid at 25° C. and is composed of at least one material selected from the group consisting of ethylene/α-olefin copolymers, poly-α-olefins and silicones, 0.1 to 30 parts by mass of an inorganic filler (C), 1.0 to 20 parts by mass of a modified olefin-based polymer (D) obtained by modifying an olefin-based polymer with at least one compound selected from the group consisting of unsaturated carboxylic acids, acid anhydrides thereof, and derivatives of these unsaturated carboxylic acids and acid anhydrides, and 0.01 to 5.0 parts by mass of an alkylene glycol-based polymer (E) having a primary amino group or a secondary amino group, per 100 parts by mass of a polyacetal copolymer (A) containing oxymethylene units as the main structural unit, and containing oxyalkylene units in a ratio of at least 0.4 mol % but not more than 0.9 mol % relative to all of the structural units; and a step of molding the resin composition into a prescribed shape.

A dust-resistant sliding member of the present invention is produced using the method for producing a dust-resistant sliding member according to the present invention described above.

A window regulator carrier plate of the present invention is produced using the method for producing a dust-resistant sliding member according to the present invention described above.

A method for realizing dust-resistant slidability for a member produced using a polyacetal resin composition according to the present invention uses a resin composition containing:

0.5 to 5.0 parts by mass of a lubricant (B) that is liquid at 25° C. and is composed of at least one material selected from the group consisting of ethylene/α-olefin copolymers, poly-α-olefins and silicones, 0.1 to 30 parts by mass of an inorganic filler (C), 1.0 to 20 parts by mass of a modified olefin-based polymer (D) obtained by modifying an olefin-based polymer with at least one compound selected from the group consisting of unsaturated carboxylic acids, acid anhydrides thereof, and derivatives of these unsaturated carboxylic acids and acid anhydrides, and 0.01 to 5.0 parts by mass of an alkylene glycol-based polymer (E) having a primary amino group or a secondary amino group, per 100 parts by mass of a polyacetal copolymer (A) containing oxymethylene units as the main structural unit, and containing oxyalkylene units in a ratio of at least 0.4 mol % but not more than 0.9 mol % relative to all of the structural units.

In any of the aspects of the present invention, the lubricant (B) is preferably an ethylene/propylene copolymer.

In any of the aspects of the present invention, the inorganic filler (C) is preferably at least one material selected from the group consisting of calcium carbonate, talc and magnesium oxide.

In any of the aspects of the present invention, the modified olefin-based polymer (D) is preferably a polymer obtained by modifying 100 parts by mass of an olefin-based polymer with 0.1 to 20 parts by mass of maleic anhydride.

The present invention is able to provide a dust-resistant sliding member which, even in an environment in which dust such as sand and moisture exist, exhibits excellent friction and wear resistance and suffers extremely little abnormal noise generation during sliding, regardless of the particle size of the dust, and also exhibits excellent mechanical properties (tensile strength), as well as providing a method for producing the dust-resistant sliding member, a window regulator carrier plate, and a method for realizing dust-resistant slidability.

DETAILED DESCRIPTION

<Resin Composition for Dust-Resistant Sliding Member>

A resin composition for a dust-resistant sliding member according to an embodiment of the present invention (hereafter also referred to as simply "the resin composition") contains 0.5 to 5.0 parts by mass of a lubricant (B) that is liquid at 25° C. and is composed of at least one material selected from the group consisting of ethylene/α-olefin copolymers, poly-α-olefins and silicones, 0.1 to 30 parts by mass of an inorganic filler (C), 1.0 to 20 parts by mass of a modified olefin-based polymer (D) obtained by modifying an olefin-based polymer with at least one compound selected from the group consisting of unsaturated carboxylic acids, acid anhydrides thereof, and derivatives of these unsaturated carboxylic acids and acid anhydrides, and 0.01 to 5.0 parts by mass of an alkylene glycol-based polymer (E) having a primary amino group or a secondary amino group, per 100 parts by mass of a polyacetal copolymer (A) containing oxymethylene units as the main structural unit, and containing oxyalkylene units in a ratio of at least 0.4 mol % but not more than 0.9 mol % relative to all of the structural units.

Here, the expression "dust-resistant sliding" refers to performance that exhibits excellent friction and wear resistance and good suppression of abnormal noise generation, even in environments in which dust such as sand and moisture such as rainwater exist. The expression "friction and wear resistance" means having durability relative to friction and abrasion.

As mentioned above, the resin composition for a dust-resistant sliding member according to this embodiment has the effects of providing excellent friction and wear resistance and extremely little abnormal noise generation during sliding, even in environments in which dust such as sand and moisture exist, regardless of the particle size of the dust, as well as providing excellent mechanical properties (tensile strength). The mechanism of these effects is described below.

POM resins are prone to the generation of abnormal noises known as squeak noises when sliding occurs between POM resin members. In order to ameliorate this problem, a technique is used in which a lubricant is added to prevent sliding between the POM resin members. However, in the above type of environments where dust and moisture exist, the occurrence of abnormal noises is unable to be satisfactorily suppressed using this technique. One reason for this is that when sliding occurs at the sliding surface of a resin molded item, the frictional heat generated by sliding increases the temperature, but if moisture is present, then the temperature is less likely to rise. Accordingly, in the case where a solid lubricant is used, the solid lubricant is less likely to undergo a phase change to a liquid, meaning the inherent functionality of the lubricant is less likely to manifest. Moreover, if dust such as sand exists on the sliding surface, then the generation of wear debris tends to be accelerated by the dust. As a result, a sliding state between POM resin members develops between the resin molded article and the wear debris, under conditions in which the lubricant is unable to function efficiently, leading to the occurrence of squeak noises.

Accordingly, the present embodiment uses a specific lubricant that is a liquid at 25° C., meaning the inherent functionality of the lubricant can manifest even in environments in which moisture exists. However, investigations by the inventors of the present invention revealed that the generation of abnormal noises could not be satisfactorily suppressed simply by using this lubricant. It is thought that this is because, in the presence of dust, localized increases in surface pressure occur on the sliding surface. Accordingly, an inorganic filler is also used to suppress this type of localized increase in surface pressure, thereby suppressing the occurrence of abnormal noises.

However, in environments where dust having a small particle size exists, abnormal noises tend to occur more easily, and in such environments, the occurrence of abnormal noises can sometimes not be completely suppressed. As a result of intensive investigation, the inventors of the present invention discovered that by adding specific amounts of two specific compatibilizers (a modified olefin-based polymer, and an alkylene glycol-based polymer having a primary amino group or a secondary amino group), the occurrence of abnormal noises could be suppressed even in environments where dust having a small particle size exists. In other words, in the present embodiment, by using specific amounts of these two specific compatibilizers in addition to the components described above, the occurrence of abnormal noises was able to be suppressed regardless of the particle size of the dust.

Further, there was some concern that the addition of these compatibilizers may cause a deterioration in the mechanical properties. Accordingly, in the present embodiment, the mechanical properties are improved by using a specific polyacetal copolymer as the POM resin.

On the other hand, in the friction and wear resistance evaluation test described below, when the load is gradually increased, if the surface pressure at which abnormal noises occur is 4.0 MPa or higher, then abnormal noise generation during sliding can be suppressed in environments in which dust such as sand and moisture exist. In other words, in the evaluation test described below, a surface pressure at which abnormal noises occur of 4.0 MPa or higher can be used as an indicator of excellent dust-resistant slidability.

(Evaluation Test)

Using the test device described below, the load was increased stepwise from 0 MPa in accordance with Method A of JIS K 7218, and the surface pressure at which abnormal noise occurred was determined.

Test piece: hollow circular cylindrical shape (inner diameter: 20 mm, outer diameter: 25.6 mm, height: 15 mm)

Test device: thrust-type friction and wear tester EFM-III-E, manufactured by Orientec Co., Ltd.

Environment: 23° C., 50% RH

Linear speed: 10 mm/sec

Test duration: 3 hours (dusty water was applied, and after sliding for 2 hours, dusty water was reapplied, and sliding was continued for a further 1 hour)

Opposing material: polyethylene-coated flat sheet

Each of the components of the resin composition according to the present embodiment is described below.

[Polyacetal Copolymer (A)]

In the present embodiment, the polyacetal copolymer (A) (hereafter also referred to as "the component (A)") is used as the POM resin. The component (A) in this embodiment contains oxymethylene units (—$CH_2O$—) as the main structural unit, and also contains oxyalkylene units in a ratio of at least 0.4 mol % but not more than 0.9 mol % relative to all of the structural units. By using this type of component (A), the mechanical properties can be improved.

Examples of the oxyalkylene units include an oxyethylene unit, oxypropylene unit and oxybutylene unit.

There are no particular limitations on the polymerization degree of the component (A), and any resin having melt molding processability may be used (for example, resins having a melt flow rate (MFR) at 190° C. and a load of 2,160 g of at least 1.0 g/10 min but not more than 100 g/10 min).

The component (A) may be produced using known production methods.

In the component (A) of the present embodiment, the ratio of oxyalkylene units relative to all of the structural units is at least 0.4 mol % but not more than 0.9 mol %. If this ratio is less than 0.4 mol %, then the thermal stability tends to be unsatisfactory, whereas if the ratio exceeds 0.9 mol %, then the mechanical properties (tensile strength) deteriorate. The ratio of oxyalkylene units relative to all of the structural units is preferably at least 0.5 mol % but not more than 0.8 mol %, and even more preferably at least 0.5 mol % but not more than 0.7 mol %.

[Lubricant (B)]

The lubricant (B) (hereafter also referred to as "the component (B)") used in the present embodiment is at least one material selected from the group consisting of ethylene/α-olefin copolymers, poly-α-olefins and silicones, and is a liquid at 25° C. Because the lubricant is a liquid at 25° C., it remains a liquid even in environments containing moisture where the temperature is less likely to rise, and can therefore still function satisfactorily as a lubricant.

Examples of the ethylene/α-olefin copolymers include copolymers of ethylene and an α-olefin having a carbon number of 3 to 20. For example, ethylene/propylene copolymers, ethylene/butylene copolymers and ethylene/hexene copolymers are preferred, and of these, ethylene/propylene copolymers are particularly preferred.

Examples of the poly-α-olefins include polymers of α-olefins having a carbon number of 6 to 18, and of these, polymers of α-olefins having a carbon number of 10 to 16 are preferred.

Examples of the silicones include dimethylpolysiloxanes, methylphenylpolysiloxanes and methylhydrogenpolysiloxanes, and of these, dimethylpolysiloxanes are preferred.

Any of the ethylene/α-olefin copolymers, poly-α-olefins and silicones may be used individually, or a combination of materials may be used. Further, among ethylene/α-olefin copolymers, poly-α-olefins and silicones, in terms of suppressing squeak noises, ethylene/α-olefin copolymers are preferred.

In the present embodiment, the component (B) is included in an amount of 0.5 to 5.0 parts by mass per 100 parts by mass of the component (A). If the amount of the component (B) is less than 0.5 parts by mass, then the occurrence of squeak noises cannot be satisfactorily suppressed, whereas if the amount exceeds 5.0 parts by mass, the manufacturability deteriorates markedly. The amount of the component (B) is preferably from 0.8 to 4.0 parts by mass, and more preferably from 1.0 to 2.0 parts by mass.

[Inorganic Filler (C)]

Examples of the inorganic filler (C) (hereafter also referred to as "the component (C)") that may be used in the present embodiment include metal carbonates, metal sulfates, metal oxides, talc, mica, glass beads and glass flakes. Of these, calcium carbonate, magnesium oxide, aluminum oxide, talc and glass beads are preferred. Moreover, at least one filler selected from the group consisting of calcium carbonate, talc and magnesium oxide is particularly preferred. These inorganic fillers may be used individually, or a combination of two or more different inorganic fillers may be used.

In the present embodiment, the component (C) is included in an amount of 0.1 to 30 parts by mass per 100 parts by mass of the polyacetal copolymer (A). If the amount of the component (C) is less than 0.1 parts by mass, then the occurrence of squeak noises cannot be satisfactorily suppressed, whereas if the amount exceeds 30 parts by mass, then deterioration in the mechanical properties becomes marked. The amount of the component (C) is preferably from 0.2 to 20 parts by mass, and more preferably from 0.3 to 10 parts by mass.

In the present embodiment, the mass ratio (X/Y) between the lubricant (X) and the inorganic filler (Y) is preferably from 1.5 to 5.0.

[Modified Olefin-Based Polymer (D)]

The modified olefin-based polymer (D) (hereafter also referred to as "the component (D)") used in the present embodiment is obtained by modifying an olefin-based polymer with at least one compound selected from the group consisting of unsaturated carboxylic acids, acid anhydrides thereof, and derivatives of these unsaturated carboxylic acids and acid anhydrides. Using the component (D) in combination with the alkylene glycol-based polymer (E) improves the friction and wear resistance, and can suppress the occurrence of abnormal noises even in environments where dust of small particle size exists.

Examples of olefin-based polymers that may be used include homopolymers of α-olefins such as ethylene, propylene, butene, hexene, octene, nonene, decene and dodecene; random, block or graft copolymers of two or more of these α-olefins; and random, block and graft copolymers containing one of these α-olefins and at least one comonomer component selected from among non-conjugated diene components such as 1,4-hexadiene, dicyclopentadiene, 5-ethylidene-2-norbornene and 2,5-norbornadiene, conjugated diene components such as butadiene, isoprene and piperylene, α,β-unsaturated acids such as acrylic acid and methacrylic acid or derivatives thereof such as esters, aromatic vinyl compounds such as acrylonitrile, styrene and α-methylstyrene, vinyl esters such as vinyl acetate, vinyl ethers such as vinyl methyl ether, and derivatives of these vinyl-based compounds. There are no particular limitations on the polymerization degree of the polymer, the presence or degree of side chains or branching, or the copolymer composition ratio.

Examples of the olefin-based polymer include high-pressure polyethylene, moderate- or low-pressure polyethylene, gas phase ethylene/α-olefin copolymers, LLDPE, polypropylene, polybutene, ethylene/vinyl acetate copolymers, ethylene/methyl acrylate copolymers, ethylene/ethyl acrylate copolymers, ethylene/butyl acrylate copolymers, ethylene/propylene copolymers, and ethylene/propylene/diene terpolymers. Preferred polymers include polyethylene, ethylene/methyl acrylate copolymers and ethylene/ethyl acrylate copolymers.

Examples of monomer compounds that may be used for modifying the above olefin-based polymer include at least one compound selected from the group consisting of unsaturated carboxylic acids such as acrylic acid, methacrylic acid, maleic acid, citraconic acid, itaconic acid, tetrahydrophthalic acid, nadic acid, methylnadic acid and allylsuccinic acid, unsaturated carboxylic acid anhydrides such as maleic anhydride, citraconic anhydride, itaconic anhydride, tetrahydrophthalic anhydride, nadic anhydride, methylnadic anhydride and allylsuccinic anhydride, and derivatives of these unsaturated carboxylic acids and unsaturated carboxylic acid anhydrides.

The component (D) has a MI (melt index) that is preferably from 0.01 to 100 g/10 min, more preferably from 0.1 to 50 g/10 min, and even more preferably from 0.2 to 30 g/10 min.

Specific examples of preferred compounds for the component (D) include maleic anhydride-modified polyethylene, polypropylene, ethylene/propylene copolymers and ethylene/ethyl acrylate copolymers.

In one example of a preferred modification method for obtaining the component (D), the olefin-based polymer and at least one monomer compound selected from the group consisting of unsaturated carboxylic acids, acid anhydrides thereof, and derivatives of these unsaturated carboxylic acids and acid anhydrides are reacted by heating in a solution state or a melted state in the presence of an appropriate radical initiator such as an organic peroxide, but the invention is not limited to this particular method.

The amounts of the two components are typically set so that the amount of the above monomer compound is at least 0.1 parts by mass but not more than 20 parts by mass, and preferably at least 0.1 parts by mass but not more than 10 parts by mass, per 100 parts by mass of the olefin-based polymer. If modification is performed using this type of blend ratio, then satisfactory affinity can be achieved between the component (A) and the component (D), and physical properties such as the slidability can be favorably maintained.

In the present embodiment, a single component (D) may be used, or a combination of two or more different components may be used. One example of a combination of two or more components is a combination of a maleic anhydride-modified polyethylene and a maleic anhydride-modified ethylene/ethyl acrylate copolymer.

In the present embodiment, the component (D) is included in an amount of 1.0 to 20 parts by mass per 100 parts by mass of the component (A). If the amount of the component (D) is less than 1.0 parts by mass, then the occurrence of squeak noises cannot be satisfactorily suppressed, whereas if the amount exceeds 20 parts by mass, then deterioration in the mechanical properties becomes marked. The amount of the component (D) is preferably from 1.5 to 10 parts by mass, and more preferably from 1.8 to 5.0 parts by mass.

[Alkylene Glycol-Based Polymer (E)]

The alkylene glycol-based polymer (E) (hereafter also referred to as "the component (E)") used in the present embodiment has a primary amino group or a secondary amino group. As described above, using the component (E) in combination with the component (D) improves the friction and wear resistance, and can suppress the occurrence of abnormal noises even in environments where dust of small particle size exists. Examples of the component (E) include polyethylene glycol, polypropylene glycol and polytetramethylene glycol. The alkylene glycol-based polymer having a primary amino group or secondary amino group used in the present embodiment is an alkylene glycol-based polymer of the type described above to which a primary amino group or a secondary amino group is bonded. The amino group is preferably bonded at the terminal of the alkylene glycol-based polymer.

The number average molecular weight of the component (E) is typically at least 400 but not more than 500,000, and is preferably at least 400 but not more than 100,000, and more preferably at least 1,000 but not more than 6,000. This is because addition of the component (E) improves the dispersibility of the component (D) in the component (A), and by ensuring that the number average molecular weight of the component (E) is at least 400 but not more than 500,000, dispersion in the component (A) can be achieved with an appropriate melt viscosity, without impairing the mechanical properties and sliding properties of the polymer materials of the components (A) and (B).

In the present embodiment, the component (E) is included in an amount of 0.01 to 5.0 parts by mass per 100 parts by mass of the polyacetal copolymer. If the amount of the component (E) is less than 0.01 parts by mass, then the occurrence of squeak noises cannot be satisfactorily suppressed, whereas if the amount exceeds 5.0 parts by mass, then deterioration in the mechanical properties becomes marked. The amount of the component (E) is preferably from 0.05 to 3.0 parts by mass, and more preferably from 0.1 to 2.0 parts by mass.

In the present embodiment, from the viewpoint of improving the friction and wear resistance, the mass ratio (P/Q) between the modified olefin-based polymer (P) and the alkylene glycol-based polymer (Q) is preferably from 4.0 to 40.

[Other Components]

The resin composition of the present embodiment may also include conventional additives such as antioxidants, costabilizers, release agents and nucleating agents as other components.

<Dust-Resistant Sliding Member>

A dust-resistant sliding member according to one embodiment of the present invention is produced using the resin composition for a dust-resistant sliding member described above. As mentioned above, the dust-resistant sliding member according to this embodiment is a member which, even in an environment in which dust such as sand and moisture exist, exhibits excellent friction and wear resistance and suffers extremely little abnormal noise generation during sliding, regardless of the particle size of the dust, and also exhibits excellent mechanical properties (tensile strength).

Specific examples of the dust-resistant sliding member obtained by molding the resin composition according to an embodiment of the present invention include not only the window regulator carrier plate described below, but also sliding members for vehicle sunroofs, and mechanism members for vehicle door checkers. In other words, the dust-resistant sliding member is ideal as a member that is used in environments in which dust and water exist.

<Window Regulator Carrier Plate>

A window regulator carrier plate according to one embodiment of the present invention is produced using the resin composition for a dust-resistant sliding member, in a similar manner to that described above for the dust-resistant sliding member. As mentioned above, a window regulator is a mechanism for raising and lowering the door glass of an automobile, and the carrier plate that supports the door glass is produced using the resin composition according to an embodiment of the present invention. Dust such as sand and moisture such as rainwater can sometimes penetrate into the interior of doors of vehicles such as automobiles. However, even in these types of cases, if the carrier plate of the present embodiment is installed, then the carrier plate exhibits excellent friction and wear resistance, and the generation of abnormal noises such as squeak noises when the window is raised and lowered, namely when the carrier plate undergoes sliding, can be suppressed.

<Method for Producing Dust-Resistant Sliding Member>

A method for producing a dust-resistant sliding member according to an embodiment of the present invention includes a step (hereafter referred to as "step A") of preparing a resin composition containing 0.5 to 5.0 parts by mass of a lubricant (B) that is liquid at 25° C. and is composed of at least one material selected from the group consisting of ethylene/α-olefin copolymers, poly-α-olefins and silicones, 0.1 to 30 parts by mass of an inorganic filler (C), 1.0 to 20 parts by mass of a modified olefin-based polymer (D) obtained by modifying an olefin-based polymer with at least one compound selected from the group consisting of unsaturated carboxylic acids, acid anhydrides thereof, and derivatives of these unsaturated carboxylic acids and acid anhydrides, and 0.01 to 5.0 parts by mass of an alkylene glycol-based polymer (E) having a primary amino group or a secondary amino group, per 100 parts by mass of a polyacetal copolymer (A) containing oxymethylene units as the main structural unit, and containing oxyalkylene units in a ratio of at least 0.4 mol % but not more than 0.9 mol % relative to all of the structural units; and a step (hereafter referred to as "step B") of molding the resin composition into a prescribed shape. Each step is described below.

[Step A]

In this step, a resin composition is prepared that contains 0.5 to 5.0 parts by mass of the component (B), which is liquid at 25° C. and is composed of at least one material selected from the group consisting of ethylene/α-olefin copolymers, poly-α-olefins and silicones, 0.1 to 30 parts by mass of the component (C), 1.0 to 20 parts by mass of the component (D), and 0.01 to 5.0 parts by mass of the component (E), per 100 parts by mass of the component (A). Examples of preferred materials for each of the components, preferred amounts for each of the components, and examples of other components that may be used, are all the same as described above. The resin composition can be obtained by normal methods, by mixing each of the above components and any other components that may be used as required. For example, the resin composition of the present embodiment can be obtained by supplying the components to an extruder, and performing melt-kneading and pelletization.

[Step B]

In this step, the resin composition prepared in the above step A is molded into a prescribed shape. For example, the pellets obtained in the manner described above may be subjected to injection molding by introduction into an injection molding machine having a prescribed mold.

The production method of the present embodiment described above is able to produce a dust-resistant sliding member which, as mentioned above, even in an environment in which dust such as sand and moisture exist, exhibits excellent friction and wear resistance and suffers extremely little abnormal noise generation during sliding, regardless of the particle size of the dust, and also exhibits excellent mechanical properties (tensile strength).

<Method for Realizing Dust-Resistant Slidability>

A method for realizing dust-resistant slidability according to one embodiment of the present invention uses the resin composition containing 0.5 to 5.0 parts by mass of a lubricant (B) that is liquid at 25° C. and is composed of at least one material selected from the group consisting of ethylene/α-olefin copolymers, poly-α-olefins and silicones, 0.1 to 30 parts by mass of an inorganic filler (C), 1.0 to 20 parts by mass of a modified olefin-based polymer (D) obtained by modifying an olefin-based polymer with at least one compound selected from the group consisting of unsaturated carboxylic acids, acid anhydrides thereof, and derivatives of these unsaturated carboxylic acids and acid anhydrides, and 0.01 to 5.0 parts by mass of an alkylene glycol-based polymer (E) having a primary amino group or a secondary amino group, per 100 parts by mass of a polyacetal copolymer (A) containing oxymethylene units as the main structural unit, and containing oxyalkylene units in a ratio of at least 0.4 mol % but not more than 0.9 mol % relative to all of the structural units.

As mentioned above, a member obtained by molding this resin composition exhibits excellent friction and wear resistance and suffers extremely little abnormal noise generation during sliding, even in environments in which dust such as sand and moisture exist, regardless of the particle size of the dust, and also exhibits excellent mechanical properties (tensile strength). In other words, by using the resin composition of an embodiment of the present invention, a member formed using the polyacetal resin composition can be imparted with dust-resistant slidability.

EXAMPLES

The present invention is described below in further detail based on a series of examples, but the present invention is in no way limited by these examples.

Examples 1 to 8, Comparative Examples 1 to 7

In each example and comparative example, the raw material components shown in Table 1 or Table 2 were dry-blended, and the resulting mixture was introduced into a twin-screw extruder having a cylinder temperature of 200° C., subjected to melt-kneading, and then pelletized. In Table 1 and Table 2, the numerical value for each component indicates a number of parts by mass.

Details regarding each of the raw material components used are listed below.

(1) Polyacetal Copolymers

A-1: a polyacetal copolymer having a ratio of oxyalkylene units (oxyethylene groups) of 0.7 mol % relative to all of the structural units (melt index (measured at 190° C. and a load of 2,160 g): 2.4 g/10 min)

A-2: a polyacetal copolymer having a ratio of oxyalkylene units (oxybutylene groups) of 0.5 mol % relative to all of the structural units (melt index (measured at 190° C. and a load of 2,160 g): 2.7 g/10 min)

A-3: a polyacetal copolymer having a ratio of oxyalkylene units (oxyethylene groups) of 1.2 mol % relative to all of the structural units (melt index (measured at 190° C. and a load of 2,160 g): 2.5 g/10 min)

(2) Lubricants

B-1: an ethylene/propylene copolymer (pour point: −15° C., LUCANT HC600, manufactured by Mitsui Chemicals, Inc.)

B-2: a dimethylpolysiloxane (pour point: −41° C., SH200, manufactured by Dow Corning Toray Co., Ltd.)

(3) Inorganic Fillers

C-1: calcium carbonate (SL-101, manufactured by Shiraishi Calcium Kaisha, Ltd.)

D-2: maleic anhydride-modified ERA (ethylene/ethyl acrylate copolymer) (100 parts by mass of EEA modified with 1 part by mass of maleic anhydride)

D-3: LDPE (low-density polyethylene)-g-AS (acrylonitrile/styrene copolymer) (MODIPER A1401, manufactured by NOF Corporation)

(5) Alkylene Glycol-Based Polymer

E-1: dual terminal amine-modified polyethylene glycol (CHENIIISTAT Y-400, manufactured by Sanyo Chemical Industries, Ltd.)

(6) Antioxidant

Irganox 1010, manufactured by BASF Corporation

TABLE 1

| | | oxyalkylene content (mol%) | Example 1 | 2 | 3 | 4 | 5 | 6 | 7 | 8 |
|---|---|---|---|---|---|---|---|---|---|---|
| Polyacetal copolymer (A) | A-1 | 0.7 | 100 | — | 100 | 100 | 100 | 100 | 100 | 100 |
| | A-2 | 0.5 | — | 100 | — | — | — | — | — | — |
| | A-3 | 1.2 | — | — | — | — | — | — | — | — |
| Lubricant (B) | B-1 | ethylene/propylene copolymer | 1.0 | 1.0 | — | 1.0 | 1.0 | 1.0 | 1.0 | 1.0 |
| | B-2 | dimethylpolysiloxane | — | — | 1.0 | — | — | — | — | — |
| Inorganic filler (C) | C-1 | calcium carbonate | 0.5 | 0.5 | 0.5 | 0.5 | — | — | — | — |
| | C-2 | calcium carbonate | — | — | — | — | 0.5 | — | — | — |
| | C-3 | calcium carbonate | — | — | — | — | — | 0.5 | — | — |
| | C-4 | talc | — | — | — | — | — | — | 0.5 | — |
| | C-5 | magnesium oxide | — | — | — | — | — | — | — | 0.5 |
| Modified olefin-based polymer (D) | D-1 | maleic anhydride-modified LDPE | 2.0 | 2.0 | 2.0 | 1.5 | 2.0 | 2.0 | 2.0 | 2.0 |
| | D-2 | maleic anhydride-modified EEA | — | — | — | 0.5 | — | — | — | — |
| | D-3 | LDPE-g-AS | — | — | — | — | — | — | — | — |
| Alkylene glycol-based polymer (E) | E-1 | dual terminal amine-modified polyethylene glycol | 0.15 | 0.15 | 0.15 | 0.15 | 0.15 | 0.15 | 0.15 | 0.15 |
| Antioxidant | | — | 0.25 | 0.25 | 0.25 | 0.25 | 0.25 | 0.25 | 0.25 | 0.25 |

TABLE 2

| | | oxyalkylene content (mol%) | Comparative Example 1 | 2 | 3 | 4 | 5 | 6 | 7 |
|---|---|---|---|---|---|---|---|---|---|
| Polyacetal copolymer (A) | A-1 | 0.7 | 100 | 100 | 100 | 100 | — | — | 100 |
| | A-2 | 0.5 | — | — | — | — | — | — | — |
| | A-3 | 1.2 | — | — | — | — | 100 | 100 | — |
| Lubricant (B) | B-1 | ethylene/propylene copolymer | 1.0 | — | 1.0 | 1.0 | 1.0 | 1.0 | 0.3 |
| | B-2 | dimethylpolysiloxane | — | — | — | — | — | — | — |
| Inorganic filler (C) | C-1 | calcium carbonate | — | 0.5 | 0.5 | 0.5 | 0.5 | 0.5 | 0.5 |
| | C-2 | calcium carbonate | — | — | — | — | — | — | — |
| | C-3 | calcium carbonate | — | — | — | — | — | — | — |
| | C-4 | talc | — | — | — | — | — | — | — |
| | C-5 | magnesium oxide | — | — | — | — | — | — | — |
| Modified olefin-based polymer (D) | D-1 | maleic anhydride-modified LDPE | — | — | — | — | 2.0 | 0.8 | 2.0 |
| | D-2 | maleic anhydride-modified EEA | — | — | — | — | — | — | — |
| | D-3 | LDPE-g-AS | — | — | — | 2.0 | — | — | — |
| Alkykene glycol-based polymer (E) | E-1 | dual terminal amine-modified polyethylene glycol | — | — | — | — | 0.15 | 0.08 | 0.15 |
| Antioxidant | | — | 0.25 | 0.25 | 0.25 | 0.25 | 0.25 | 0.25 | 0.25 |

C-2: calcium carbonate (Brilliant-1500, manufactured by Shiraishi Calcium Kaisha, Ltd.)

C-3: calcium carbonate (Whiton P-30, manufactured by Shiraishi Calcium Kaisha, Ltd.)

C-4: talc (Crown Talc PP, manufactured by Matsumura Sangyo Co., Ltd.)

C-5: magnesium oxide (KYOWAMAG MF150, manufactured by Kyowa Chemical Industry Co., Ltd.)

(4) Modified Olefin-Based Polymers

D-1: maleic anhydride-modified LDPE (low-density polyethylene) (100 parts by mass of LDPE modified with 1 part by mass of maleic anhydride)

<Evaluations>

[Dust-Resistant Slidability]

Using the resin composition pellets obtained in each of the examples and comparative examples, hollow circular cylindrical test pieces were produced by injection molding (mold temperature: 80° C., cylinder temperature: 200° C.). In each evaluation test, in order to generate environments in which dust and moisture existed, the three types of dust, described below having different average particle sizes were each dispersed in pure water at a concentration of 2.5% by mass to prepare three types of dusty water.

(1) ISO dust (ISO 12103-1 (A4), average particle size: 35 μm)

(2) JIS dust (HS Z8901 (class 8), average particle size: 10 μm)

(3) CHINA DUST (manufactured by fiatec GmbH, average particle size: 7 μm)

In order to evaluate the dust-resistant slidability, evaluations were performed for the friction and wear resistance (coefficient of dynamic friction) and the level of squeak noises. For each evaluation, three of the above test pieces were prepared for each example and comparative example, and each of the three types of dusty water described above was applied to the sliding surface of one of the three test pieces. An evaluation test described below was then performed in accordance with method A of JIS K 7218. Details regarding the test conditions are described below, (Evaluation Items)

(1) Coefficient of dynamic friction (–): calculated from the value for the frictional force detected with a load cell. The average value for the final 1 hour of the test was recorded in Table 3 or Table 4.

(2) Squeak noise (%): for the final 1 hour of the test, the percentage of time during which squeak noises occurred (%) was recorded in Table 3 or Table 4.

[Mechanical Properties]

The resin composition pellets obtained in each of the examples and comparative examples were used to prepare test pieces in accordance with ISO 527, and the tensile strength of each test piece was then measured (ISO 527-2/1A/50). The measurement results are shown in Table 3 and Table 4.

TABLE 3

| | | | Example | | | | | | | |
|---|---|---|---|---|---|---|---|---|---|---|
| | | | 1 | 2 | 3 | 4 | 5 | 6 | 7 | 8 |
| Dust-resistant slidability | ISO dust (large particle size) | Coefficient of dynamic friction | 0.27 | 0.25 | 0.26 | 0.24 | 0.28 | 0.26 | 0.25 | 0.27 |
| | | Squeak noise incidence (%) | ○ (0) | ○ (0) | ○ (0) | ○ (0) | ○ (0) | ○ (0) | ○ (0) | ○ (0) |
| | JIS dust (medium particle size) | Coefficient of dynamic friction | 0.31 | 0.31 | 0.33 | 0.30 | 0.32 | 0.30 | 0.30 | 0.32 |
| | | Squeak noise incidence (%) | ○ (0) | ○ (0) | ○ (0) | ○ (0) | ○ (0) | ○ (0) | ○ (0) | ○ (0) |
| | CHINA DUST (small particle size) | Coefficient of dynamic friction | 0.31 | 0.33 | 0.32 | 0.33 | 0.30 | 0.30 | 0.31 | 0.32 |
| | | Squeak noise incidence (%) | ○ (0) | ○ (0) | ○ (0) | ○ (0) | ○ (0) | ○ (0) | ○ (0) | ○ (0) |
| Mechanical properties | — | Tensile strength (ISO 527) | 54.9 | 55.1 | 56.2 | 55.0 | 54.7 | 54.7 | 54.6 | 54.9 |

TABLE 4

| | | | Comparative Example | | | | | | |
|---|---|---|---|---|---|---|---|---|---|
| | | | 1 | 2 | 3 | 4 | 5 | 6 | 7 |
| Dust-resistant slidability | ISO dust (large particle size) | Coefficient of dynamic friction | 0.39 | 0.41 | 0.35 | 0.28 | 0.25 | 0.26 | 0.32 |
| | | Squeak noise incidence (%) | × (100) | × (100) | Δ (37) | ○ (0) | ○ (0) | ○ (0) | ○ (0) |
| | JIS dust (medium particle size) | Coefficient of dynamic friction | 0.36 | 0.38 | 0.41 | 0.35 | 0.32 | 0.30 | 0.41 |
| | | Squeak noise incidence (%) | × (100) | × (100) | × (100) | Δ (34) | ○ (0) | Δ (6) | Δ (22) |
| | CHINA DUST (small particle size) | Coefficient of dynamic friction | 0.40 | 0.41 | 0.40 | 0.32 | 0.32 | 0.32 | 0.38 |
| | | Squeak noise incidence (%) | × (100) | × (100) | × (100) | Δ (27) | ○ (0) | ○ (0) | Δ (18) |
| Mechanical properties | — | Tensile strength (ISO 527) | 59.9 | 62.7 | 59.8 | 57.0 | 52.9 | 54.5 | 56.7 |

(Test conditions)

Test device: thrust-type friction and wear tester manufactured by Orientec Co., Ltd.

Surface pressure: 1.0 MPa (load 200 N)

Environment: 23° C., 50% RH

Linear speed: 10 mm/sec

Test duration: 3 hours (the dusty water was applied, and after sliding for 2 hours, the dusty water was reapplied, and sliding was continued for a further 1 hour)

Opposing material: polyethylene-coated flat sheet

Based on Table 3 and Table 4, it is evident that each example exhibited good dust-resistant slidability, suffered absolutely no squeak noise, and also exhibited excellent mechanical properties. In particular, in all of the examples, the squeak noise incidence was 0% regardless of the dust particle size. In other words, it is clear that in each of the examples, a member having excellent dust-resistant slidability and excellent mechanical properties was able to be obtained. In contrast, none of the comparative examples was able to achieve favorable results for all of the squeak noise evaluation, the friction and wear resistance evaluation, and the mechanical properties.

What is claimed is:

1. A method for producing a dust-resistant sliding member, the method consisting essentially of:
   a step of preparing a resin composition containing:
   0.5 to 5.0 parts by mass of a lubricant (B) that is liquid at 25° C. and is composed of at least one material selected from the group consisting of ethylene/α-olefin copolymers, poly-α-olefins and silicones,
   0.1 to 30 parts by mass of an inorganic filler (C),
   1.0 to 20 parts by mass of a modified olefin-based polymer (D) obtained by modifying an olefin-based polymer with at least one compound selected from the group consisting of unsaturated carboxylic acids, acid anhydrides thereof, and derivatives of these unsaturated carboxylic acids and acid anhydrides, and
   0.01 to 5.0 parts by mass of an alkylene glycol-based polymer (E) having a primary amino group or a secondary amino group, per 100 parts by mass of a polyacetal copolymer (A) containing oxymethylene units as a-main structural unit, and containing oxyalkylene units (except oxymethylene units) in a ratio of at least 0.4 mol % but not more than 0.9 mol % relative to all structural units; and
   a step of molding the resin composition into a prescribed shape.

2. The method for producing a dust-resistant sliding member according to claim 1, wherein the lubricant (B) is an ethylene/propylene copolymer.

3. The method for producing a dust-resistant sliding member according to claim 1, wherein the inorganic filler (C) is at least one material selected from the group consisting of calcium carbonate, talc and magnesium oxide.

4. The method for producing a dust-resistant sliding member according to claim 2, wherein the inorganic filler (C) is at least one material selected from the group consisting of calcium carbonate, talc and magnesium oxide.

5. The method for producing a dust-resistant sliding member according to claim 1, wherein the modified olefin-based polymer (D) is obtained by modifying 100 parts by mass of an olefin-based polymer with 0.1 to 20 parts by mass of maleic anhydride.

6. The method for producing a dust-resistant sliding member according to claim 2, wherein the modified olefin-based polymer (D) is obtained by modifying 100 parts by mass of an olefin-based polymer with 0.1 to 20 parts by mass of maleic anhydride.

7. A dust-resistant sliding member, produced using the method for producing a dust-resistant sliding member according to claim 1.

8. A window regulator carrier plate, produced using the method for producing a dust-resistant sliding member according to claim 1.

9. A method for realizing dust-resistant slidability for a member produced using a polyacetal resin composition, wherein the method uses a resin composition consisting essentially of:
   0.5 to 5.0 parts by mass of a lubricant (B) that is liquid at 25° C. and is composed of at least one material selected from the group consisting of ethylene/α-olefin copolymers, poly-α-olefins and silicones,
   0.1 to 30 parts by mass of an inorganic filler (C),
   1.0 to 20 parts by mass of a modified olefin-based polymer (D) obtained by modifying an olefin-based polymer with at least one compound selected from the group consisting of unsaturated carboxylic acids, acid anhydrides thereof, and derivatives of these unsaturated carboxylic acids and acid anhydrides, and
   0.01 to 5.0 parts by mass of an alkylene glycol-based polymer (E) having a primary amino group or a secondary amino group, per 100 parts by mass of a polyacetal copolymer (A) containing oxymethylene units as a main structural unit, and containing oxyalkylene units (except oxymethylene units) in a ratio of at least 0.4 mol % but not more than 0.9 mol % relative to all structural units.

10. The method for realizing dust-resistant slidability for a member produced using a polyacetal resin composition according to claim 9, wherein the lubricant (B) is an ethylene/propylene copolymer.

11. The method for realizing dust-resistant slidability for a member produced using a polyacetal resin composition according to claim 9, wherein the inorganic filler (C) is at least one material selected from the group consisting of calcium carbonate, talc and magnesium oxide.

12. The method for realizing dust-resistant slidability for a member produced using a polyacetal resin composition according to claim 10, wherein the inorganic filler (C) is at least one material selected from the group consisting of calcium carbonate, talc and magnesium oxide.

13. The method for realizing dust-resistant slidability for a member produced using a polyacetal resin composition according to claim 9, wherein the modified olefin-based polymer (D) is obtained by modifying 100 parts by mass of an olefin-based polymer with 0.1 to 20 parts by mass of maleic anhydride.

14. The method for realizing dust-resistant slidability for a member produced using a polyacetal resin composition according to claim 10, wherein the modified olefin-based polymer (D) is obtained by modifying 100 parts by mass of an olefin-based polymer with 0.1 to 20 parts by mass of maleic anhydride.

* * * * *